United States Patent
Kohno et al.

[11] Patent Number: 5,803,210
[45] Date of Patent: Sep. 8, 1998

[54] DISK BRAKES

[75] Inventors: Takefumi Kohno; Masakazu Hiro; Yoshio Soda; Mitsuhiro Ishii, all of Yokohama, Japan

[73] Assignee: Nippon Oil Co., Ltd., Tokyo, Japan

[21] Appl. No.: 808,578

[22] Filed: Feb. 28, 1997

Related U.S. Application Data

[63] Continuation-in-part of Ser. No. 578,148, Dec. 27, 1995, abandoned.

[30] Foreign Application Priority Data

Dec. 28, 1994 [JP] Japan .................................... 6-337670
Feb. 6, 1995 [JP] Japan ...................................... 7-39382

[51] Int. Cl.$^6$ .................................................... F16D 69/02
[52] U.S. Cl. ................ 188/73.1; 188/73.2; 188/218 XL; 188/251 A; 188/251 M; 188/251 R; 188/71.5
[58] Field of Search .................................. 188/218, 71.5, 188/73.2, 73.1, 251 R, 251 A, 251 M, 218 R, 250 G, 250 B; 192/70.11, 70.14, 70.15, 70.2, 107 M; 428/408, 113, 218, 220, 36.1; 156/148, 149; 28/107, 39; 427/228, 249; 423/447.4, 447.7, 447.1; 264/29.1, 29.5, 29.7, 29.2, 29.6

[56] References Cited

U.S. PATENT DOCUMENTS

| | | | |
|---|---|---|---|
| 3,639,197 | 2/1972 | Spain | 161/35 |
| 3,692,150 | 9/1972 | Ruppe, Jr. | 188/71.5 |
| 3,759,353 | 9/1973 | Marin | 188/71.5 |
| 3,956,548 | 5/1976 | Kovac et al. | 428/64 |
| 3,966,029 | 6/1976 | Spain | 188/218 X |
| 4,119,179 | 10/1978 | Masclet | 188/73.2 |
| 4,297,307 | 10/1981 | Taylor | 264/29.5 |
| 4,457,967 | 7/1984 | Chareire et al. | 428/212 |
| 4,742,948 | 5/1988 | Fisher et al. | 188/251 A |
| 4,804,071 | 2/1989 | Schultz et al. | 188/71.5 |
| 4,849,200 | 7/1989 | Uemura et al. | 423/447.4 |
| 4,996,037 | 2/1991 | Berkebile et al. | 423/447.4 |
| 5,007,508 | 4/1991 | Lacombe | 188/251 A |
| 5,093,156 | 3/1992 | Uemura et al. | 427/249 |
| 5,143,184 | 9/1992 | Snyder et al. | 188/218 X |
| 5,238,672 | 8/1993 | Sumner et al. | 423/447.4 |
| 5,242,746 | 9/1993 | Bommier et al. | 428/252 |
| 5,316,654 | 5/1994 | Berkebile et al. | 423/447.1 |
| 5,377,792 | 1/1995 | Idesawa | 188/251 R |
| 5,398,784 | 3/1995 | Haneda et al. | 188/218 |
| 5,399,378 | 3/1995 | Uemura et al. | 423/447.7 |
| 5,433,937 | 7/1995 | Sohda et al. | 264/29.2 |
| 5,503,254 | 4/1996 | Fisher et al. | 188/71.5 |
| 5,523,035 | 6/1996 | Sohda et al. | 264/29.6 |
| 5,587,203 | 12/1996 | Soda et al. | 427/228 |
| 5,609,707 | 3/1997 | Bazshushtani et al. | 156/148 |
| 5,614,134 | 3/1997 | Sohda et al. | 264/29.5 |
| 5,614,164 | 3/1997 | Sumner et al. | 423/447.4 |
| 5,643,663 | 7/1997 | Bommier et al. | 192/107 M |
| 5,654,059 | 8/1997 | Hecht | 428/218 |
| 5,705,008 | 1/1998 | Hecht | 156/148 |

FOREIGN PATENT DOCUMENTS

| | | |
|---|---|---|
| 2004091 | 5/1990 | Canada . |
| 51695 | 5/1936 | Denmark . |
| 0 235 011 A1 | 9/1987 | European Pat. Off. . |
| 2 587 992 A1 | 4/1987 | France . |
| 2640375 A | 3/1977 | Germany . |
| 63-76926 A | 4/1988 | Japan . |
| 4-78332 A | 3/1992 | Japan . |
| 4-78333 A | 3/1992 | Japan . |
| 4-231739 A | 8/1992 | Japan . |
| 1059299 | 2/1967 | United Kingdom . |
| 1103154 | 2/1968 | United Kingdom . |
| 91/09233 | 6/1991 | WIPO . |
| 91/16554 | 10/1991 | WIPO . |

Primary Examiner—Douglas C. Butler
Attorney, Agent, or Firm—Kubovcik & Kubovcik

[57] ABSTRACT

A disk pad type brake comprises a rotor disk provided with a carbon-carbon composite material (a) as a friction member, and at least one pad provided with a carbon-carbon composite material (b) as a friction member, wherein the difference in thermal conductivity between the materials (a) and (b) is 30 to 450 W/m·K in the radial direction; and a multi-disk type brake comprises at least one rotor disk provided with a carbon-carbon composite material (c) as a friction member, and at least one stator disk provided with a carbon-carbon composite material (d) as a friction member, wherein the difference in thermal conductivity between the materials (c) and (d) is 30 to 450 W/m·K in the radial direction.

26 Claims, 1 Drawing Sheet

DISK BRAKES

This application is a continuation-in-part application of application Ser. No. 08/578,148, filed Dec. 27, 1995, now abandoned.

BACKGROUND OF THE INVENTION

1. Field of the Invention

The present invention relates to disk brakes.

2. Prior Art

Disk brakes are widely used in various fields, e.g., in motorcycles, automobiles, railway vehicles and airplanes, as one type of friction brakes. The disk brakes are classified into a disk pad type brake, a multi-disk brake and the like in accordance with the differences in their styles. An organic material, a metal-based material, a carbon-carbon composite material or the like is used in a conventional disk brake.

An organic brake material is used mainly as a pad material or pad surface material (lining material) of a disk pad type brake.

According to the typical manufacturing method of the organic brake material, a thermosetting resin, e.g., a phenol resin, is reinforced by organic fibers, metal fibers, inorganic fibers or the like to prepare a composite material which was incorporated with various kinds of additives to adjust the friction performance of a brake to be obtained, molded into a desired shape and then subjected to heat treatment and the like in accordance with the purpose for which the resulting brake is used. The organic matter as the major ingredient of the organic brake material is decomposed at a temperature of about 300° C. or more. Thus, when a brake made from the organic material is used for braking an object moving at a high speed or is used under a high pressing force, it will be decomposed and deteriorated by the frictional heat, thereby to remarkably shorten its service life and obtain no sufficient braking force due to its fading phenomenon and the like.

Metal-based brake material includes a cast iron-, forged steel-, or alloy-based brake material. The metal-based brake material is utilized as a disk material for a disk pad type brake. In recent years, application of an aluminum alloy-based brake material to a disk is discussed for the purpose of weight reduction. The alloy-based brake material is also used as a pad material, and in particular, a copper-based sintered alloy is widely utilized as a pad material. The metal-based brake material is widely used as a disk material for a multi-disk type brake as well, and is utilized mainly as a brake material for an airplane.

When the metal-based brake material is used for braking a body moving at a high speed or is used under a high pressing force whereby it is increased frictional heat, it will exhibit a fading phenomenon at a temperature near the melting point of its principal metal ingredient. This raises a problem that a sufficient frictional force cannot be obtained. Further, when the metal-based brake material is used at a temperature equal to or higher than its melting point, the disk and the lining, after the disk is out of operation, are fusion adhered to each other and cannot be disconnected. To resume the operation, cumbersome repair or replacement of the parts cannot but be performed. Since the metal-based brake material has a large specific gravity, it will make the overall weight of a vehicle loaded therewith heavier thereby to interfere with a decrease in fuel cost and noise. Since the metal-based brake material has a large thermal expansion coefficient, it will be deteriorated with cracks and the like being accompanied by due to the impact of the frictional heat.

A carbon-carbon composite material is a carbon material reinforced with carbon fibers. As this material has a smaller specific gravity than the metal-based brake material, it is advantageous in less increasing the weight of a vehicle when the vehicle is loaded with the brake material. As this material does not have a melting point, it can avoid troubles, e.g., fusing. As this material has a decomposition temperature of as high as about 3,000° C. while the organic brake material has a lower one, its deterioration due to the frictional heat can be remarkably lessened. Furthermore, as the C/C composite material has a small thermal expansion coefficient, its durability against a thermal shock is superior to that of the organic material.

The carbon-carbon composite material-based brake material has been utilized in a field which is difficult for an organic or metal-based brake material to cope with and which particularly requires heat resistance and weight-Lightening. This C/C-based material is utilized in the disk pad type brake of a racing motorcycle or automobile and also in an airplane multi-disk type brake of a large passenger airplane, a combat aircraft and the like that are used under strict environmental conditions.

Of the above brakes, a carbon-carbon composite material-based disk pad type brake is usually such that the carbon-carbon composite material used in its rotor disk and the carbon-carbon composite material used in its pad have the same properties or characteristics.

Similarly, the carbon-carbon composite material-based multi-disk type brake is usually such that the carbon-carbon composite material used in its rotor disk and the carbon-carbon composite material used in its stator disk have the same properties or characteristics.

Even in a case where the carbon-carbon composite material has been changed in characteristics in accordance with its use, an environment in which it is used, and a method for the control of it, the carbon-carbon composite material used in the rotor disk and the carbon-carbon composite material used in the pad or stator disk has been changed to have the same new characteristics.

When the carbon-carbon composite material has been improved to enhance its durability and frictional characteristics, the carbon-carbon composite material used in the rotor disk and the carbon-carbon composite material used in the pad or stator disk have usually been changed to have the same new characteristics.

The carbon-carbon composite material used in the conventional disk pad type brake and multi-disk type brake will wear as it is used and require periodical replacement of it. In this case, although the worn-out carbon-carbon composite material is usually replaced with a new one, it is sometimes replaced with a reclaimed and regenerated one.

According to a method of reclaiming and regenerating the worn-out carbon-carbon composite material, a surfacing material made of a carbon-carbon composite material is bonded to the worn-out carbon-carbon composite material as the core material (U.S. Pat. No. 4,742,948 and Japanese Patent Gazette No. 4-63026).

According to another report (Second CPC Study Meeting, 1992), when a carbon-carbon composite material arranged on a frictionally sliding surface of a brake has desired frictional characteristics but its mechanical strength is insufficient for the conditions of use desired, in order to reinforce this material, a high-strength material different from the material of the frictionally sliding surface is adhered to the material of the surface, as an inner or reverse non-frictionally sliding part.

In these prior art techniques, however, among the carbon-carbon composite materials usually used in the rotor disk and the carbon-carbon composite materials usually used in the pad or stator disk, those having the same characteristics have been used as the friction members arranged on the frictionally sliding surfaces of the rotor disk, the pad, and the stator disk.

SUMMARY OF THE INVENTION

It is an object of the present invention to provide a highly durable brake having frictional characteristics matching its use, an environment in which it is used, and a method for controlling it.

In order to achieve the above object, there is provided a disk pad type brake comprising a rotor disk provided with a carbon-carbon composite material (a) as a friction member, and at least one pad provided with a carbon-carbon composite material (b) as a friction member; said materials (a) and (b) being each composed of carbon fibers and a carbonaceous matrix; and the difference in thermal conductivity between said materials (a) and (b) being in a range of 30 to 450 W/m·K in the radial direction thereof, wherein said material (a) is prepared by impregnating the carbon fibers with a thermoplastic organic precursor and firing so impregnated carbon fibers;

said material (b) is prepared by either 1) impregnating the carbon fibers with a thermoplastic organic precursor, firing so impregnated carbon fibers and then depositing pyrolytic carbon on so fired product, or 2) depositing pyrolytic carbon on the carbon fibers, impregnating so obtained product with a thermoplastic organic precursor and then firing so impregnated product; and said carbon fibers used in at least either of said materials (a) and (b) are pitch-based carbon fibers and/or precursors thereof.

According to the present invention, there is also provided a multi-disk type brake comprising at least one rotor disk whose friction member is made of a carbon-carbon composite material (c), and at least one stator disk whose friction member is made of a carbon-carbon composite material (d); said materials (c) and (d) being each composed of carbon fibers and a carbonaceous matrix; and the difference in thermal conductivity between said materials (c) and (d) being in a range of 30 to 450 W/m·K in the radial direction thereof, wherein said material (c) is prepared by impregnating the carbon fibers with a thermoplastic organic precursor and firing so impregnated carbon fibers;

said material (d) is prepared by either 1) impregnating the carbon fibers with a thermoplastic organic precursor, firing so impregnated carbon fibers and then depositing pyrolytic carbon on so fired product, or 2) depositing pyrolytic carbon on the carbon fibers, impregnating so obtained product with a thermoplastic organic precursor and then firing so impregnated product; and said carbon fibers used in at least either of said materials (c) and (d) are pitch-based carbon fibers and/or precursors thereof.

A disk pad type brake and a multi-disk type brake according to the present invention will be described below in detail.

Figure 1:
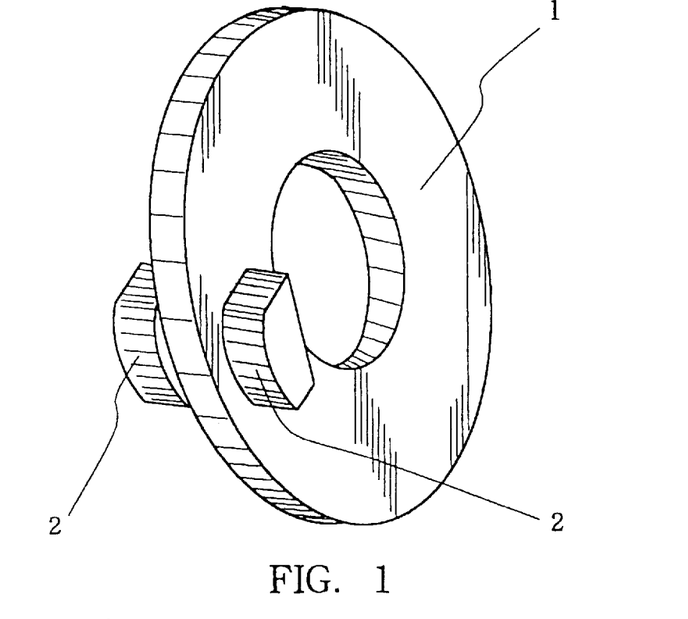
FIG. 1 is a view showing the concept of a disk pad type brake, wherein 1 is a rotor disk and 2 is a pad.

The rotor disk and pad of the disk pad type brake according to the present invention as shown in FIG. 1 have friction members respectively on their surfaces.

The friction member on the surface of the pad is sometimes called a lining.

In the present invention, a carbon-carbon composite material is used to form the friction member.

In the present invention, the rotor disk or the pad may be entirely made of by the carbon-carbon composite material.

Figure 2:
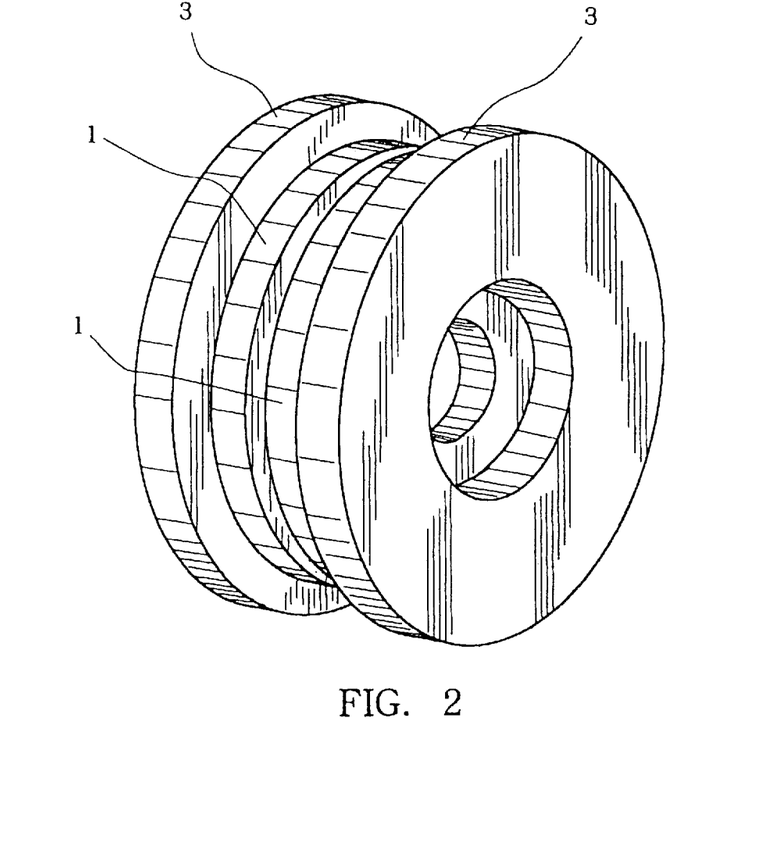
FIG. 2 is a view showing the concept of a multi-disk type brake, wherein 1 is a rotor disk and 3 is a stator disk.

The rotor disk and stator disk of the multi-disk type brake according to the present invention as shown in FIG. 2 also have friction members made of the carbon-carbon composite material on their surfaces, in the same manner as in the disk pad type brake. The rotor disk or the stator disk may be entirely made of the carbon-carbon composite material.

In the present invention, the disk of a disk pad type brake is called a rotor disk just like the rotor disk of the multi-disk type brake, as its function is similar to that of the multi-disk type brake.

Materials making up the portions other than the friction members in the disk pad type brake and the multi-disk type brake of the present invention are not particularly limited, and may be conventionally known ones.

For example, various types of metal-based materials, e.g., carbon steel, cast iron and aluminum can be used for a back plate for fixing a friction member, a cylinder for pressing the disks against each other, and an axis for rotating a rotor disk.

The disk pad type brake of the multi-disk type brake of the present invention can be provided with countermeasures for preventing the carbon-carbon composite material heated to a high temperature by frictional heat, from being worn out by oxidation. For example, the portions around the brake disk, the pad or the like can be accommodated in an inert atmosphere. A protection cover can be mounted on part of the carbon-carbon composite material. Part of the carbon-carbon composite material can be covered with an oxidation-resistant film. Alternatively, part of the carbon-carbon composite material can be reformed to an oxidation-resistant material.

The disk pad type brake of the present invention brings about a braking force by pressing the pad against the rotor disk.

Upon being pressed, the frictionally sliding portions of the friction members which are being rubbed with each other generate a frictional force. This frictional force is utilized as the braking force.

A surface having a frictionally sliding portion is wholly called a frictionally sliding surface. This frictionally sliding surface sometimes includes a non-frictionally sliding portion.

In general, the rotor disc is rotatable in sliding contact with the surface of the pad, and thus, the sliding contact sites of the disc are continuously shifted one after another as the disc rotates during braking while the frictionally sliding surface of the pad is always in contact with the frictionally sliding surface of the disc during braking.

As the non-contact portion (which does not contact with the pad even during braking) of the surface of the friction member of the rotor disk is exposed to the open air, it tends to be oxidized due to the frictional heat.

In contrast to this, as the frictionally sliding surface of the pad is kept in sliding contact with the rotor disk during braking, it is therefore not exposed to the open air during braking. However, the frictionally sliding time per unit sliding surface area of the pad is elongated, and the amount of heat received from the frictional heat is also increased.

Since the pad needs a driving device for pressing/disconnecting it to be arranged in the rear part of the pad, heat insulation for the rear part of the pad must be considered.

In this manner, in the disk pad type brake, since the rotor disk and the pad have different roles and service conditions, it is important to use their respective friction members to which respective specific characteristics have been imparted.

The multi-disk type brake of the present invention generates a braking force when its one or more rotating rotor disks and one or more non-rotating stator disks are pressed against each other.

In the multi-disk type brake of the present invention, the numbers and arrangements of rotor disks and stator disks can be selected in various manners in accordance with the purpose of use of the brake and/or required frictional characteristics. One or two surfaces of each disk can be used as the frictionally sliding surfaces in accordance with the arrangement of the disk, and a disk having no such sliding surface at all can also be used.

When a rotor disk and a stator disk are adjacent to each other, the opposite surfaces between them serve as frictionally sliding surfaces.

When two rotor disks are adjacent to each other, or when two stator disks are adjacent to each other, the opposing surfaces between them serve as a non-sliding surface. A surface having no adjacent disk also serves as a non-frictionally sliding surface.

The frictionally sliding surface is heated to a high temperature by frictional heat, whereas the non-sliding surface does not generate frictional heat.

When the non-sliding surface receives heat conducted from the interior of the disk, it dissipates heat to an adjacent disk, constituent parts other than the disk, the atmosphere or the like to cool the disk.

When the disk is heated to a high temperature by the frictional heat, the non-sliding surface and the non-sliding portions of the sliding surface are exposed to the open air and liable to be oxidized. In contrast to this, the sliding portion of the sliding surface which is kept in sliding contact during braking is not exposed to the open air and thus is not easily oxidized.

The stator disk is kept stationary, whereas the rotor disk rotates anytime or during braking.

Hence, the rotor disk must have a sufficiently large strength against a tensile stress caused by a centrifugal force generated by rotation.

In a disk having a rear surface where a pressing/disconnection driving device or the like is arranged, the component parts of the driving device or the like have low heat resistance since they are made of a material other than the carbon-carbon composite material. Thus, heat insulation for the rear surface of this disk must be considered.

In this manner, in the multi-disk type brake, the rotor disk and the stator disk have different roles and service conditions, and it is therefore important to impart different characteristics to their friction members.

Hence, in a disk pad type brake comprising a rotor disk having friction members made of a carbon-carbon composite material (a), and a pad having a friction member made of a carbon-carbon composite material (b), the difference in thermal conductivity between the materials (a) and (b) is made to be in a range of 30 to 450 W/m·K in the direction parallel to the frictionally sliding surface of the friction member, thereby obtaining a highly durable novel disk pad type brake having frictional characteristics matching its use, an environment in which it is used, and a method for the control of it.

Furthermore, in a multi-disk type brake constituted by a rotor disk having a friction member made of a carbon-carbon composite material (c), and a stator disk having a friction member made of a carbon-carbon composite material (d), the difference in thermal conductivity between said materials (c) and (d) is made to be in a range of 30 to 450 W/m·K in the direction parallel to the frictionally sliding surface of the friction member, thereby obtaining a highly durable novel multi-disk type brake having frictional characteristics matching its use, an environment in which it is used, and a method for controlling it.

Each of the carbon-carbon composite materials having different characteristics is worked as required and mounted with a jig or the like, thereby forming the whole or part of each of various type of friction members, e.g., the rotor disk, the stator disk and the pad.

When a plurality of pads or stator disks are used, the carbon-carbon composite material used in one or more of the plurality of pads or stator disks can be made to have characteristics different from those of the carbon-carbon composite material used in the corresponding rotor disks.

Two or more types of carbon-carbon composite materials having different characteristics may be worked as required and mounted with jigs or the like by using an adhesive, and may be arranged or structurally disposed at one and other portions of the various types of friction members.

As described above, the carbon-carbon composite materials having different characteristics are arranged or disposed at desired portions as the friction members in accordance with the use of the resulting brake, an environment in which it is used, and a method for controlling it, thereby to obtain a highly durable disk pad type brake and multi-disk type brake each having desired frictional characteristics.

The different characteristics between the carbon-carbon composite materials refer to at least one of thermal properties, mechanical properties, oxidation characteristics, and other material properties of the carbon-carbon composite materials.

The thermal properties include thermal conductivity and a coefficient of thermal expansion. The mechanical properties include hardness, tensile strength, a compression modulus of elasticity, and interlaminar shear strength. The oxidation characteristics include a rate of oxidation and an oxidation start temperature. Other material properties include density.

This will be described below in detail. If carbon-carbon composite materials used match one or more of the following items, they can provide a disk pad type brake and a multi-disk type brake exhibiting novel characteristics matching their respective uses, service conditions and methods for control.

The preferable carbon-carbon composite materials used in the various types of friction members described above, are those having a thermal conductivity falling within a range of 0.1 to 1,000 W/m·K.

In the present invention, in a case where carbon-carbon composite materials are so made as to have different thermal conductivities, respectively, they can be made into friction members having different characteristics.

In this case, the difference in thermal conductivity between the carbon-carbon composite materials having different thermal conductivities is 30 to 450 W/m·K, preferably 45 to 450 W/m·K and most preferably 60 to 450 W/m·K in the radial direction thereof (or in the direction parallel to the frictionally sliding surface of the friction member, hereinafter referred to as "in the radial direction"); and preferably 0.1 to 700 W/m·K, more preferably 1 to 300 W/m·K and most preferably 5 to 100 W/m·K in the thickness direction thereof (or in the direction perpendicular to the frictionally sliding surface of the friction member, hereinafter referred to as "in the thickness direction").

The thermal conductivity, which is a higher one, of the carbon-carbon composite material is preferably 1 to 300 W/m·K and more preferably 5 to 200 W/m·K in the thickness direction thereof; and preferably 10 to 700 W/m·K and more preferably 20 to 500 W/m·K in the radial direction thereof.

The thermal conductivity, which is a lower one, of the carbon-carbon composite material is preferably 5 to 500 W/m·K and more preferably 10 to 300 W/m·K in the thickness direction thereof; and preferably 0.1 to 400 W/m·K and more preferably 1 to 350 W/m·K in the radial direction thereof.

Any carbon-carbon composite materials can be used as a rotor disk material or pad material for the disk pad type brake of the present invention, as far as they have the difference falling within the above-described range in thermal conductivity in the radial direction.

In this case, the carbon-carbon composite material (a) of the rotor disk preferably has a higher thermal conductivity than that (b) of the pad in the radial direction thereof, and the carbon-carbon composite material (b) of the pad preferably has a higher thermal conductivity than that (a) of the rotor disk in the thickness direction thereof.

Further, any carbon-carbon composite materials can be used also as a rotor disk material or stator disk material for the multi-disk type brake of the present invention, as far as they have the difference falling within the above-described range in thermal conductivity in the radial direction.

In this case, the carbon-carbon composite material (c) of the rotor disk preferably has a higher thermal conductivity than that (d) of the stator disk in the radial direction thereof, and the carbon-carbon composite material (c) of the stator disk preferably has a higher thermal conductivity than that (d) of the rotor disk in the thickness direction thereof.

The carbon-carbon composite material used in the friction member preferably has a Shore hardness of 1 to 140, and more preferably a Shore hardness in a range of 30 to 140.

In the present invention, the respective carbon-carbon composite materials have different Shore hardnesses, so that they can form friction members having different characteristics.

In this case, the difference in Shore hardnesses between the carbon-carbon composite materials (a) and (b), or (c) and (d) is preferably 1 to 60, and more preferably 5 to 30.

The Shore hardness, which is a higher one, of the carbon-carbon composite material is preferably 60 to 140, and more preferably 70 to 140. The Shore hardness, which is a lower one, of the carbon-carbon composite material is preferably 30 to 100, and more preferably 30 to 90.

Further, it is preferable that the carbon-carbon composite material of the pad have a lower Shore hardness than the carbon-carbon composite material of the rotor disk.

Still further, it is preferable that the carbon-carbon composite material of the stator disk have a higher Shore hardness than the carbon-carbon composite material of the rotor disk.

The carbon-carbon composite materials used in the various types of the above friction members preferably have a tensile strength of 20 to 1,000 MPa in the radial direction of the friction member.

In the present invention, the respective carbon-carbon composite materials have different tensile strengths, so that they can form friction members having different characteristics.

In this case, the difference in tensile strength between the different types of carbon-carbon composite materials is preferably 1 to 200 MPa, more preferably 5 to 100 MPa and most preferably 10 to 50 MPa.

The tensile strength, which is a higher one, of one carbon-carbon composite material is preferably 50 to 1,000 MPa, and more preferably 60 to 400 MPa. The tensile strength, which is a lower one, of the other carbon-carbon composite material is preferably 20 to 400 MPa, and more preferably 30 to 300 MPa.

Further, the carbon-carbon composite material of the rotor disk preferably has a higher tensile strength than the carbon-carbon composite material of the pad. A rotor disk whose inner peripheral portion has a high tensile strength in the circumferential direction is particularly preferable in this case.

The carbon-carbon composite material of the rotor disk preferably has a higher tensile strength than the carbon-carbon composite material of the stator disk in the multi-disk type brake. A rotor disk whose inner peripheral portion has a high tensile strength in the circumferential direction is particularly preferable in the case of the multi-disk type brake.

The carbon-carbon composite materials used in the various types of the above friction members preferably have a compression modulus of elasticity of 0.1 to 300 GPa in the thickness direction of the friction member.

In the present invention, the respective carbon-carbon composite materials have different compression moduli of elasticity, so that they have different characteristics.

In this case, the difference in compression modulus of elasticity between the carbon-carbon composite materials (a) and (b), or (c) and (d) is preferably 0.1 to 200 GPa and more preferably 0.1 to 10 GPa.

The compression modulus of elasticity, which is a higher one, of the carbon-carbon composite material is preferably 1 to 300 GPa and more preferably 1 to 200 GPa. The compression modulus of elasticity, which is a lower one, of the carbon-carbon composite material is preferably 0.1 to 200 GPa and more preferably 0.5 to 100 GPa.

The carbon-carbon composite material of the rotor disk preferably has a higher compression modulus of elasticity than the carbon-carbon composite material of the pad.

The carbon-carbon composite material of the rotor disk preferably has a higher compression modulus of elasticity than the carbon-carbon composite material of the stator disk.

The carbon-carbon composite materials used in the various types of the above friction members preferably have an interlaminar shear strength of 0.1 to 30 MPa and more preferably 1 to 30 MPa in the radial direction of the friction member.

In the present invention, the respective carbon-carbon composite materials have different interlaminar shear strengths, so that they can form friction members having different characteristics.

In this case, the difference in interlaminar shear strength between the different carbon-carbon composite materials is preferably 0.1 to 20 MPa and more preferably 1 to 15 MPa.

The interlaminar shear strength, which is a higher one, of the carbon-carbon composite material is preferably 1 to 30 MPa and more preferably 3 to 20 MPa. The interlaminar shear strength, which is a lower one, of the carbon-carbon composite material is preferably 0.1 to 20 MPa and more preferably 1 to 15 MPa.

The carbon-carbon composite material of the pad preferably has a higher interlaminar shear strength than the carbon-carbon composite material of the rotor disk.

The carbon-carbon composite material of the stator disk preferably has a higher interlaminar shear strength than the carbon-carbon composite material of the rotor disk.

The carbon-carbon composite materials used in the various types of the above friction members preferably have a low rate of oxidation in the open air at a temperature of 600° to 1,200° C.

More specifically, preferable carbon-carbon composite materials have lower rates of oxidation in a range of $10^{-10}$ to 0.1 kg/kg per minute at 600° C., $10^{-6}$ to 0.2 kg/kg per minute at 800° C., and $10^{-3}$ to 0.3 kg/kg per minute at 1,000° C.

In the present invention, the respective carbon-carbon composite materials have different rates of oxidation, so that they can form friction members having different characteristics.

In this case, the difference in rate of oxidation in the open air between the different carbon-carbon composite materials is preferably $10^{-10}$ to 0.2 kg/kg per minute at 600° C. and more preferably $10^{-6}$ to 0.01 kg/kg per minute at 600° C.

The rate of oxidation, which is a lower one, of the carbon-carbon composite material in the open air at 600° C. is preferably $10^{-10}$ to 0.01 kg/kg per minute, and more preferably $10^{-10}$ to 0.008 kg/kg per minute. The rate of oxidation, which is a higher one, of the carbon-carbon composite material in the open air at 600° C. is preferably $10^{-6}$ to 0.1 kg/kg per minute, and more preferably $10^{-4}$ to 0.1 kg/kg per minute.

The carbon-carbon composite material of the rotor disk preferably has a lower rate of oxidation in the open air than the carbon-carbon composite material of the pad.

The carbon-carbon composite material of the rotor disk preferably has al lower rate of oxidation in the open air than the carbon-carbon composite material of the stator disk.

Assuming that a temperature at which a carbon-carbon composite material is reduced by 1 mass % when raised in temperature at a rate of 10° C. per minute in the open air is defined as an oxidation start temperature, the oxidation start temperature is desired to be as high as possible within a range of 300° to 1,200° C.

In the present invention, the respective carbon-carbon composite materials have different oxidation start temperatures, so that they can form friction members having different characteristics.

In this case, the difference in oxidation start temperature between the carbon-carbon composite materials in the open air is preferably 1° to 700° C. and more preferably 10° to 200° C.

The oxidation start temperature, which is a higher one, of the carbon-carbon composite material in the open air is preferably 600° to 1,200° C. and more preferably 700° to 1,200° C. The oxidation start temperature, which is a lower one, of the carbon-carbon composite material in the open air is preferably 300° to 900° C. and more preferably 300° to 750° C.

The carbon-carbon composite material of the rotor disk preferably has a higher oxidation start temperature in the open air than the carbon-carbon composite material of the pad.

The carbon-carbon composite material of the rotor disk preferably has a higher oxidation stator temperature in the open air than the carbon-carbon composite material of the stator disk.

The carbon-carbon composite materials used in the various types of friction members described above preferably have a density of $1.5 \times 10^3$ to $2.2 \times 10^3$ kg/m$^3$.

In the present invention, the respective carbon-carbon composite materials have different densities, so that they can form friction members having different characteristics.

In this case, the difference in density between the other carbon-carbon composite materials is preferably $0.01 \times 10^3$ to $0.7 \times 10^3$ kg/m$^3$ and more preferably $0.1 \times 10^3$ to $0.3 \times 10^3$ kg/m$^3$.

The density, which is a higher one, of the carbon-carbon composite material is preferably $1.5 \times 10^3$ to $2.2 \times 10^3$ kg/m$^3$ and more preferably $1.7 \times 10^3$ to $2.1 \times 10^3$ kg/m. The density, which is a lower one, of the carbon-carbon composite material is preferably $1.4 \times 10^3$ to $2.0 \times 10^3$ kg/m$^3$ and more preferably $1.6 \times 10^3$ to $1.9 \times 10^3$ kg/m$^3$.

The carbon-carbon composite material of the pad preferably has a lower density than the carbon-carbon composite material of the rotor disk.

The carbon-carbon composite material of the stator disk preferably has a lower density than the carbon-carbon composite material of the rotor disk.

According to the present invention, the material properties other than the aforesaid ones can be differentiated in the carbon/carbon composite materials thereby to produce a highly durable disk pad type brake and multi-disk type brake having desired frictional characteristics.

It is preferable in the present invention that carbon-carbon composite materials having different thermal conductivities or different hardnesses be arranged or disposed at desired portions of the above-mentioned various types of friction members of the rotor disk, the pad or the like in accordance with the use of the resulting brake, environments in which the brake is used, and a method for controlling the brake, thereby to obtain particular desired frictional characteristics.

Then, the carbon-carbon composite material used in the present invention will be described below in detail.

The carbon-carbon composite material used herein is a composite material comprising carbon fibers and/or their precursor fibers, and a carbonaceous matrix as major constituent elements.

The carbon-carbon composite material used herein usually has a fiber volume content or rate of 10 to 80 vol %, preferably 20 to 70 vol % and more preferably 25 to 65 vol %.

If a carbon-carbon composite material has a fiber volume content lower than the lower limit of the above range, then it will not exhibit a sufficient effect of reinforcement by the fibers and will become a brittle material which leads to a brake material having a low impact strength and low toughness against fracture, thus making it impossible for the resulting disk pad type brake or multi-disk type brake to exhibit sufficiently high performances and durability.

If the fiber volume content exceeds the upper limit of the above range, sufficiently high inter-fiber bonding strength will undesirably not be obtained.

The matrix volume content of the carbon-carbon composite material used in the present invention is determined by the fiber volume content and a void volume content, and is usually 19 to 89 vol %, preferably about 25 to 80 vol %.

The void volume content or rate of the carbon-carbon composite material used herein is usually 1 to 30 vol %, preferably 2 to 25 vol % and more preferably 2 to 10 vol %.

If the void volume rate is smaller than the lower limit of the above range, the step of densifying the composite material will become cumbersome, and an improvement in performance corresponding to an increase in manufacturing time will not be made. If the void volume rate exceeds the upper limit of the above range, the strength required for the brake material will be insufficient. In particular, it is undesirable to apply such a brake material to a rotatable rotor disk.

An example of a method of manufacturing the carbon-carbon composite material used in the present invention will be described in detail.

The carbon fibers used in the carbon-carbon composite material include pitch-, polyacrylonitrile (PAN)-, and rayon-based carbon fibers. Carbon fibers arc precarbide fibers, carbide fibers, or graphitized fibers obtained by firing precursor fibers as a raw material in an inert gas. The precursor fibers used in the preparation of the carbon-carbon composite material include various types of fibers such as pitch fibers, infusible fibers, PAN fibers, nonflammable fibers obtained by processing PAN fibers at 200° to 450° in an oxidizing atmosphere, rayon fibers, and fibers obtained by processing rayon fibers with a phosphate or nitrate.

At least one kind of fibers selected from these carbon fibers and precursor fibers can be used in the carbon-carbon composite material according to the present invention. In particular, the pitch-based carbon fibers and their precursor fibers are preferably used as they can easily increase the resulting composite material in wear resistance.

The pitch-based carbon fibers and their precursor fibers usually can be used in at least either of the brake components (rotor disk and pad, or rotor disk and stator disk) of each of the disk pad type and multi-disk type brakes, and preferably be used in both the brake components of each brake.

The carbonaceous pitch for use as a raw material for the above pitch-based carbon fibers, includes a coal-based, petroleum-based or synthetic pitch usually having a softening point of 100° to 400° C. and preferably 150° to 350° C. The carbonaceous pitch used, may be an optically isotropic or optically anisotropic one. The optically anisotropic carbonaceous pitch is preferable, and in particular, an optically anisotropic carbonaceous pitch containing the optical anisotropic phase in an amount of 60 to 100 vol % is especially preferable.

There are obtained pitch fibers normally having an average diameter of 5 to 100 $\mu$m and preferably 7 to 30 $\mu$m by melt-spinning the carbonaceous pitch by a known method.

Subsequently, the thus obtained pitch fibers are processed to make them infusible in an oxidizing gas atmosphere at a temperature of usually 50° to 400° C. and preferably 100° to 350° C., thus providing infusible fibers. The oxidizing gas includes air, oxygen, a nitrogen compound, a sulfur compound, a halogen or their mixture.

The processing time for rendering the pitch fibers infusible is usually 10 minutes to 20 hours. The obtained infusible fibers are further processed in an inert gas atmosphere at usually 350° to 3,000° C., preferably at 400° to 2,800° C., for 1 second to 5 hours, thus obtaining pitch-based carbon fibers.

The carbon fibers or precursor fibers are usually used in the form of a bundle of about 500 to 25,000, preferably about 500 to 6,000 of continuous carbon fibers. At least one of such bundles may be used in the preparation of a unidirectional sheet or a laminate of unidirectional sheets, a two-dimensional fabric or a laminate of two-dimensional fabrics, a three-dimensional fabric or a mat type molding.

Fibers obtained by cutting the continuous carbon fibers and/or precursor fibers into pieces of a desired length, or carbon fibers and/or precursor fibers manufactured as staple fibers obtained from the spinning step can also be used for the above purpose. Such a bundle of fibers can be split and used as an aggregate of random staple fiber filaments. These staple fibers can be used in the form of a felt type sheet, a laminate of felt type sheets, or a mat type molding.

The above laminates, fabrics and mats can be used in any friction members of the disk pad type brake and multi-disk type brake of the present invention without any particular limits. However, two- or three-dimensional fabrics are preferably used in the friction members of the rotor disks which will be used as rotating components.

In contrast, mat type moldings are preferably used in the friction members of the pad and stator disk which will be used as stationary components. The mat type moldings include yarn mats composed of continuous carbon fibers and/or the precursors of pitch-based continuous carbon fibers, and felt mats composed of staple carbon fibers and/or the precursors of pitch-based staple carbon fibers.

The carbon fibers and/or precursor fibers or a molding made of at least one kind of fibers selected from the carbon fibers and the precursor fibers may be used as it is or after further molded into sheets, blocks or cylinders. These moldings are generically named herein "carbon fiber moldings". To prepare the carbon fiber moldings, a known method for laminating, needle punching, hot pressing, filament winding or the like may be employed. Alternatively, a plurality of these methods may also be employed.

In the present invention, a carbonaceous matrix is referred to as a matrix obtained by thermally processing a thermoplastic organic precursor and/or by pyrolyzing a gas phase precursor of hydrocarbons or the like. At least the carbonaceous matrixes of the carbon-carbon composite materials (b) and (d) used in the pad and stator disk are each obtained by both thermally processing a thermoplastic organic precursor and pyrolyzing a gas phase precursor of hydrocarbons or the like. Further, it is preferable that the carbonaceous matrixes of the carbon-carbon composite materials (a) and (c) used in the rotor disks also be obtained, as well as the materials (b) and (d), by both thermally processing a thermoplastic organic precursor and pyrolyzing a gas phase precursor of hydrocarbons or the like. In those cases, either of the thermal processing and the pyrolysis may be performed first.

A typical example of the thermoplastic organic precursor is a carbonaceous pitch. The carbonaceous pitch includes a coal-based, petroleum-based or synthetic pitch usually having a softening point of 60° to 400° C. and preferably 60° to 350° C.

One or more types of the above pitches can be used as a binder pitch and an impregnating pitch. As a binder pitch, one having a softening point of 200° to 400° C. is used particularly preferably. As an impregnating pitch, one having a softening point of 60° to 200° C. is used particularly preferably.

As the binder pitch and the impregnating pitch, an optically isotropic one and an optically anisotropic can both be used. In particular, as the binder pitch, an optically anisotropic pitch whose content of the optical anisotropic phase falls within a range of 60 to 100 vol % is particularly preferably used.

Carbon fibers or a carbon fiber molding is impregnated with the thermoplastic organic precursor and fired, thus producing a carbon-carbon composite material. Although firing can be performed at a reduced or atmospheric pressure, it is usually performed in a pressurized atmosphere or under uniaxial pressing.

The firing in a pressurized atmosphere is performed in an inert or reducing gas atmosphere while applying a pressure of 0.1 to 1,000 MPa, and preferably about 0.5 to 100 MPa, at usually a temperature of 400° to 2,000° C., and preferably about 500° to 1,500° C. with use of a high-pressure firing unit, a hydrostatic hot press unit or the like.

Firing under uniaxial pressing is performed with a hot press unit or the like at a high uniaxial pressure of usually 0.1 to 50 MPa, preferably about 0.4 to 5 MPa, at a maximum temperature of 400° to 2,000° C. and preferably about 500° to 1,000° C. In this case, the ambient pressure can be selected from vacuum, a reduced pressure, a normal atmospheric pressure and a superatmospheric pressure. The gas atmosphere can also be selected from vacuum, an inert atmosphere, a reducing gas atmosphere and the atmosphere.

The inert gas used herein includes nitrogen, argon or helium that is generally known as an inert gas. The reducing gas includes hydrogen or carbon monoxide. The state under a vacuum or reduced pressure is a state where an inert gas, a reducing gas or the air is present at a pressure less than the atmospheric pressure, i.e., at about $10^{-5}$ Pa at the lowest.

The gas phase precursor used herein may be any carbon atom-containing compound that can be gasified. Pyrolytic carbon obtained by pyrolyzing a gas phase precursor may be deposited on carbon fibers or a molding thereof to obtain a carbon-carbon composite material.

The treatment of deposition of pyrolytic carbon mentioned here is to form carbon by gas phase pyrolysis of hydrocarbons or the like for depositing the carbon, and is generally called chemical vapor deposition (CVD). More specifically, a hydrocarbon such as methane, ethane, acetylene, propane, benzene or a natural gas, or a material obtained by diluting at least one of these hydrocarbons with an inert gas or hydrogen is used as a raw material to be pyrolyzed in the gas phase for depositing the resulting pyrolytic carbon on the carbon fiber molding.

The thermal decomposition or pyrolyzing temperature is usually 700° to 3,000° C. and preferably 800° to 2,500° C.

Although pyrolysis can be performed at an atmospheric pressure, it is preferable to perform the pyrolysis at a reduced pressure, more specifically 50 to 10,000 Pa and preferably about 50 to 5,000 Pa.

When the carbon-carbon composite material so obtained has desired physical properties such as desired density, matrix volume content and void volume content it can be used as a friction member for the brake without or after grinding and the like.

When the carbon-carbon composite material so obtained does not have such desired physical properties, e.g., desired density, matrix volume content, void volume content, hardness and thermal conductivity, it may further be impregnated with an organic precursor as described above and fired, or it gets pyrolytic carbon to be deposited thereon once or more, thus obtaining a carbon-carbon composite material having such desired physical properties. This processing or treatment is called densification processing.

When the carbon-carbon composite material thus obtained still does not have such desired physical properties as above, it may be densified as described above and thereafter fired.

Said firing treatment is to fire a carbon-carbon composite material in an inert atmosphere at a reduced pressure, an atmospheric pressure or an elevated pressure. The pressure in the inert atmosphere is $10^{-8}$ to 200 MPa and preferably 0.1 to 100 MPa. The treatment temperature varies depending on predetermined desired physical properties, and is normally 1,500° to 3,000° C.

Firing treatment can be performed every time densification treatment is finished or discontinuously after densification is performed optionally repeatedly in compliance with predetermined desired physical properties to be obtained. The firing temperature can be selected for each firing operation.

In methods of manufacturing carbon-carbon composite materials as described above, there will be obtained carbon-carbon composite materials having characteristics at least one of which is different from one another by suitably selecting one or more operational factors such as the type of carbon fibers, the type of precursor fibers, a method of manufacturing the carbon fibers and precursor fibers, the volume content of the carbon fibers, a mixing ratio of carbon fibers to precursor fibers if two or more types of carbon fibers and precursor fibers are employed, the type of carbon fiber moldings, the type of a matrix raw material, the volume content of the matrix, a compounding ratio of matrices if two or more different kinds of matrices are employed, a void volume content, a densification method and its conditions, firing conditions and the like.

In this case, it is preferable that a matrix used in at least either of the brake components of each of the disk pad type and multi-disk type brakes be composed of a carbonaceous pitch and pyrolytic carbon. Further, it is most preferable that the matrices used in both the brake components of each brake be composed of a carbonaceous pitch and pyrolytic carbon.

The matrix may also contain a thermosetting resin such as a phenol resin in order to further improve the resulting carbon-carbon composite material in frictional and wearing characteristics. In this case, the content of the thermosetting resin in the carbon-carbon composite material is in an amount by weight of 0.1–10%, preferably 0.5–7% and more preferably 0.5–5%, of the total weight of the composite material.

The thermosetting resin is mainly used to prepare carbon-carbon composite materials comprising staple carbon fibers which are preferably used for pads and stator disks. In this case, the staple fibers are first impregnated with the thermosetting resin and cured in order to bind them together.

DESCRIPTION OF THE PREFERRED EMBODIMENTS

The present invention will be described in detail by way of preferred Examples thereof. Note that the present invention is not limited to these Examples.

EXAMPLE 1

A two-dimensional reinforced carbon-carbon composite material A prepared from two-dimensional fabrics made of pitch-based carbon fibers as reinforcing fibers as well as a pitch-based carbonaceous matrix and chemical vapor deposition carbon (CVD carbon) each as a matrix, was employed as a rotor disk material.

Two felt mat-reinforced carbon-carbon composite materials B each prepared from a felt mat made of pitch-based carbon fibers as reinforcing fibers as well as a pitch-based carbonaceous matrix and CVD carbon each as a matrix, were employed as pad materials. Table 1 shows the physical properties of the materials A and B.

The rotor disk material A is higher in thermal conductivity in the radial direction than the pad material B by 88.0 W/m·K.

A disk pad type brake having these carbon-carbon composite materials A and B respectively as its rotor disk and pads, was evaluated for the friction coefficient and abrasion wear of the brake by using a brake tester, wherein the rotor disk was bolted to an SUS 316-based disk holder and the pads were each fitted into an SUS 316-based holder having the same shape as the pad. Table 3 shows the testing conditions.

As a result, the coefficient of friction was 0.55, and the average abrasion wear per frictionally slid surface which was evaluated by dividing four into the total amount of the rotor disk and pads worn, was 0.31 μm every braking, thus finding that a brake which is highly durable and has a large braking force was obtained (Table 4).

EXAMPLE 2

The carbon-carbon composite material A described in Example 1 was employed as a rotor disk material. Two yarn mat-reinforced carbon-carbon composite materials C each prepared from a yarn mat made of pitch-based carbon fibers as reinforcing fibers as well as a pitch-based carbonaceous matrix and CVD carbon each as a matrix, were employed as pad materials. Table 1 shows the physical properties of the materials A and C.

The rotor disk material A is higher in thermal conductivity in the radial direction than the pad material C by 137.9 W/m·K.

A disk pad type brake having these carbon-carbon composite materials A and C respectively as its rotor disk and pads, was tested in the same manner as described in Example 1. As a test result, the brake indicated that its coefficient of friction was 0.46 and its average abrasion wear was 0.39 μm every braking, thus finding that a highly durable brake was obtained (Table 4).

EXAMPLE 3

A brake test was conducted in the same manner as in Example 1 except that the above carbon-carbon composite material B was employed as a rotor disk material and the above two carbon-carbon composite materials A were employed as pad materials.

The pad material A is higher in thermal conductivity in the radial direction than the rotor disk material B by 88.0 W/m·K.

As a test result, the brake tested indicated that its coefficient of friction was 0.42 and its average abrasion wear was 0.41 μm every braking, thus finding that a highly durable brake was obtained (Table 4).

EXAMPLE 4

A brake test was conducted in the same manner as in Example 1 except that the above carbon-carbon composite material C was employed as a rotor disk material and the above two carbon-carbon composite materials A were employed as pad materials.

The pad material A is higher in thermal conductivity in the radial direction than the rotor disk material C by 137.9 W/m·K.

As a test result, the brake tested indicated that its coefficient of friction was 0.46 and its average abrasion wear was 0.40 μm every braking, thus finding that a highly durable brake was obtained (Table 4).

EXAMPLE 5

A brake test was conducted in the same manner as in Example 1 except that the above carbon-carbon composite material B was employed as a rotor disk material and the above two carbon-carbon composite materials C were employed as pad materials.

The rotor disk material B is higher in thermal conductivity in the radial direction than the pad material C by 49.9 W/m·K.

As a test result, the brake tested indicated that its coefficient of friction was 0.53 and its average abrasion wear was 0.60 μm every braking, thus finding that a brake having a large braking force was obtained (Table 4).

Comparative Example 1

A brake test was conducted in the same manner as in Example 1 except that the carbon-carbon composite materials A described above were employed as both a rotor disk material and two pad materials.

As a result, the brake tested indicated that its coefficient of friction was 0.42 and its average abrasion wear was 1.44 μm every braking. Thus, this brake was increased in the abrasion wear as compared to that of Example 1 (Table 4).

Comparative Example 2

A brake test was conducted in the same manner as in Example 1 except that the carbon-carbon composite materials B described above were employed as both a rotor disk material and two pad materials.

As a result, the brake widely varied in its coefficient of friction from 0.2 to 0.5, thus finding that the brake did not have a stable braking force as compared to that of Example 1 (Table 4).

Comparative Example 3

A brake test was conducted in the same manner as in Example 1 except that the carbon-carbon composite materials C described above were employed as both a rotor disk material and two pad materials.

As a result, the brake tested indicated that its coefficient of friction was 0.57 and its average abrasion wear was 2.92 μm every braking. Thus, this brake was increased in the abrasion wear as compared to that of Example 1 (Table 4).

Comparative Example 4

A two-dimensional reinforced carbon-carbon composite material D prepared from two-dimensional fabrics made of PAN-based carbon fibers as reinforcing fibers and a pitch-based carbonaceous matrix as a matrix, was employed as a rotor disk material.

Two felt mat-reinforced carbon-carbon composite materials E each prepared from a felt mat made of PAN-based carbon fibers as reinforcing fibers and a phenol resin-based carbonaceous matrix as a matrix, were employed as pad materials. Table 2 shows the physical properties of the materials D and E.

The rotor disk material D is higher in thermal conductivity in the radial direction than the pad material E by 5.3 W/m·K.

A disk pad type brake having these carbon-carbon composite materials D and E respectively as its rotor disk and pads, was tested in the same manner as in Example 1. As a result, the brake tested indicated that its coefficient of friction was 0.2 to 0.6 and its average abrasion wear was 16.84 μm every braking. Thus, this brake was found to widely vary in the friction coefficient and be greatly increased in the abrasion wear, as compared to that of Example 1 (Table 4).

Comparative Example 5

A brake test was conducted in the same manner as in Example 1 except that the carbon-carbon composite material A described above was employed as a rotor disk material and two carbon-carbon composite materials F were employed as pad materials.

The rotor disk material A is higher in thermal conductivity in the radial direction than the pad material F by 115.8 W/m·K.

As a test result, the brake indicated that its coefficient of friction was 0.38 and its average abrasion wear was 4.09 μm every braking. Thus, this brake was greatly increased in the abrasion wear as compared to that of Example 1 (Table 4).

Comparative Example 6

A brake test was conducted in the same manner as in Example 1 except that the above carbon-carbon composite material B was employed as a rotor disk material and the above two carbon-carbon composite materials F were employed as pad materials.

The rotor disk material B is higher in thermal conductivity in the radial direction than the pad material F by 27.8 W/m·K.

As a test result, the brake indicated that its coefficient of friction was 0.43 and its average abrasion wear was 6.99 μm every braking. Thus, this brake was greatly increased in the abrasion wear as compared to that of Example 1 (Table 4).

TABLE 1

| Test Material | A | B | C |
|---|---|---|---|
| Reinforced Structure of Carbon Fiber Molding | Laminate of two-dimensional fabrics | Felt mat | Yarn mat |
| Kind of Carbon Fiber and the Volume Content vol % | pitch-based continuous fiber 55 | pitch-based staple fiber 34 | pitch-based continuous fiber 33 |
| Kind of Matrix and its Volume Content vol % | pitch-based carbon 18 CVD carbon 22 | pitch-based carbon 28 CVD carbon 30 | pitch-based carbon 24 CVD carbon 32 |
| Void Volume Content vol % | 5 | 8 | 11 |
| Final Firing Temperature °C. | 2,300 | 2,150 | 2,150 |
| Density g/cm³ | 1.9 | 1.9 | 1.8 |
| Thermal Conductivity in the radial direction w/m · K | 189.0 | 101.0 | 51.1 |

TABLE 2

| Test Material | D | E | F |
|---|---|---|---|
| Reinforced Structure of Carbon Fiber Molding | Laminate of two-dimensional fabrics | Felt mat | Felt mat |
| Kind of Carbon Fiber and the Volume Content vol % | PAN-based continuous fiber 58 | PAN-based staple fiber 29 | pitch-based staple fiber 31 |
| Kind of Matrix and its Volume Content vol % | pitch-based carbon 34 | phenol-based carbon 58 | phenol-based carbon 37 CVD carbon 21 |
| Void Volume Content vol % | 8 | 13 | 11 |
| Final Firing Temperature °C. | 2,300 | 2,150 | 2,150 |
| Density g/cm³ | 1.7 | 1.6 | 1.6 |
| Thermal Conductivity in the radial direction W/m · K | 64.0 | 58.7 | 73.2 |

TABLE 3

| Item | Testing Conditions |
|---|---|
| Testing Method | Deceleration and stop test under constant pressing force |
| Inertial Mass | 0.39 kg · m² |
| Rotor Disk | Outer diameter: 130 mm; inner diameter: 36 mm; thickness: 20 mm |
| Pad | Upper bottom: 20 mm; lower bottom: 30 mm; height: 20 mm; thickness: 20 mm |

TABLE 3-continued

| Item | Testing Conditions |
|---|---|
| Average Radius of Frictionally Sliding Area | 54.13 mm |
| Initial Velocity | 4,100 rpm |
| Pressing Force | 785 N |

TABLE 4

| | Rotor Disk Material | Pad Material | Difference in Thermal conductivity between Rotor disk and Pad materials in radial direction W/m · K | Friction Co-efficient | Average Abrasion wear of Disk and Pads (μm/evry braking) |
|---|---|---|---|---|---|
| Ex. 1 | A | B | 88.0 | 0.55 | 0.31 |
| Ex. 2 | A | C | 137.9 | 0.46 | 0.39 |
| Ex. 3 | B | A | 88.0 | 0.42 | 0.41 |
| Ex. 4 | C | A | 137.9 | 0.46 | 0.40 |
| Ex. 5 | B | C | 49.9 | 0.53 | 0.60 |
| Comp. Ex. 1 | A | A | 0 | 0.42 | 1.44 |
| Comp. Ex. 2 | B | B | 0 | 0.2–0.5 | 1.07 |
| Comp. Ex. 3 | C | C | 0 | 0.57 | 2.92 |
| Comp. Ex. 4 | D | E | 5.3 | 0.2–0.6 | 16.84 |
| Comp. Ex. 5 | A | F | 115.8 | 0.38 | 4.09 |
| Comp. Ex. 6 | B | F | 27.8 | 0.43 | 6.99 |

EXAMPLE 6

The aforesaid carbon-carbon composite material A was employed as a rotor disk material and the aforesaid carbon-carbon composite material B was employed as a stator disk material.

The rotor disk material A is higher in thermal conductivity in the radial direction than the stator disk material B by 88.0 W/m·K.

A multi-disk type brake having one rotor disk A and one stator disk B was evaluated for the friction coefficient and abrasion wear of the brake by using a brake tester, wherein the rotor disk and the stator disk were each bolted to an SUS 316-based disk holder. Table 5 shows the testing conditions.

As a result, the coefficient of friction was 0.58, and the average of the specific abrasion wear per frictionally slid surface, which was evaluated by dividing two into the total specific abrasion wear of both the disks, was $9.2 \times 10^{-3}$ cm$^{-3}$/MJ, thus finding that the brake obtained had a large braking force and was highly durable (Table 6).

EXAMPLE 7

A brake test was conducted in the same manner as in Example 6 except that the above carbon-carbon composite material A was employed as a rotor disk material and the above carbon-carbon composite material C was employed as a stator disk material.

The rotor disk material A is higher in thermal conductivity in the radial direction than the stator disk material C by 137.9 W/m·K.

As a test result, the brake tested indicated that its coefficient of friction was 0.55 and its average of the specific abrasion wear was $8.8 \times 10^{-3}$ cm$^3$/MJ, thus finding that the brake obtained had a large braking force and was highly durable (Table 6).

Comparative Example 9

A brake test was conducted in the same manner as in Example 6 except that the carbon-carbon composite materials A described above were employed as both a rotor disk material and a stator disk material.

As a result, the brake tested indicated that its coefficient of friction was 0.32 and its average of the specific abrasion wear was $20.6 \times 10^{-3}$ cm$^3$/MJ. Thus, this brake was somewhat lower in braking force and durability than that of Example 6 (Table 6).

Comparative Example 10

A brake test was conducted in the same manner as in Example 6 except that the above carbon-carbon composite material D was employed as a rotor disk material and the above carbon-carbon composite material E was employed as a stator disk material.

The stator disk material E is higher in thermal conductivity in the radial direction than the rotor disk material D by 5.3 W/m·K.

As a test result, the brake indicated that its coefficient of friction was 0.40 and its average of the specific abrasion wear was $131.1 \times 10^3$ cm$^3$/MJ. Thus, this brake was greatly increased in the abrasion wear as compared to that of Example 6 (Table 6).

Comparative Example 11

A brake test was conducted in the same manner as in Example 6 except that the above carbon-carbon composite material A was employed as a rotor disk material and the above carbon-carbon composite material F was employed as a stator disk material.

The rotor disk material A is higher in thermal conductivity in the radial direction than the stator disk material F by 115.8 W/m·K.

As a test result, the brake indicated that its coefficient of friction was 0.38 and its average of the specific abrasion wear was $47.2 \times 10^{-3}$ cm$^3$/MJ. Thus, this brake was greatly increased in the abrasion wear as compared to that of Example 6 (Table 6).

Comparative Example 12

A brake test was conducted in the same manner as in Example 6 except that the above carbon-carbon composite material B was employed as a rotor disk material and the above carbon-carbon composite material F was employed as a stator disk material.

The rotor disk material B is higher in thermal conductivity in the radial direction than the stator disk material F by 27.8 W/m·K.

As a test result, the brake indicated that its coefficient of friction was 0.38 and its average of the specific abrasion wear was $66.1 \times 10^{-3}$ cm$^3$/MJ. Thus, this brake was greatly increased in the abrasion wear as compared to that of Example 6 (Table 6).

TABLE 5

| | Ex. 6, 7<br>Comp. Ex. 9, 10, 11, 12 | Ex. 8, 9<br>Comp. Ex. 13, 14, 15, 16 |
|---|---|---|
| Testing Method | Deceleration and stop test under constant pressing force | |
| Inertial Mass per Frictionally Sliding Surface kg · m$^2$ | 0.39 | 100 |
| Rotor Disk mm | Outer diameter: 130<br>Inner diameter: 36<br>Thickness: 20 | Outer diameter: 422<br>Inner diameter: 194<br>Thickness: 20 |
| Stator Disk mm | Outer diameter: 130<br>Inner diameter: 100<br>Thickness: 20 | Outer diameter: 450<br>Inner diameter: 232<br>Thickness: 20 |
| Average Radius of Frictionally Sliding Area mm | 57.5 | 163.5 |
| Initial Velocity rpm | 3737 | 2180 |
| Pressing Force N | 551 | 8230 |

TABLE 6

| | Rotor Disk Material | Stator Disk Material | Difference in Thermal conductivity between Rotor and Stator disk materials in radial direction W/m · K | Friction Co-efficient | Average Specific Abrasion wear of Disks ($10^{-3}$ × cm$^3$/MJ) |
|---|---|---|---|---|---|
| Ex. 6 | A | B | 88.0 | 0.58 | 9.2 |
| Ex. 7 | A | C | 137.9 | 0.55 | 8.8 |
| Comp. Ex. 9 | A | A | 0 | 0.32 | 20.6 |
| Comp. Ex. 10 | D | E | 5.3 | 0.40 | 131.1 |
| Comp. Ex. 11 | A | F | 115.8 | 0.38 | 47.2 |
| Comp. Ex. 12 | B | F | 27.8 | 0.38 | 66.1 |

EXAMPLE 8

The aforesaid two carbon-carbon composite material A were employed as rotor disk materials and the aforesaid two carbon-carbon composite materials B were employed as stator disk materials.

The rotor disk material A is higher in thermal conductivity in the radial direction than the stator disk material B by 88.0 W/m·K.

A multi-disk type brake constituted by arranging one stator disk B, two rotor disks A and one stator disk B in this order was evaluated for the friction coefficient and abrasion wear of the brake by using a brake tester, wherein the rotor disks and stator disks were each bolted to an SUS 316-based disk holder. Table 5 shows the testing conditions.

As a result, the coefficient of friction was 0.40, and the average of the specific abrasion wear per frictionally slid surface, which was evaluated by dividing four into the total specific abrasion wear of the four disks, was $0.44 \times 10^{-5}$ cm$^3$/MJ, thus finding that a highly durable brake was obtained (Table 7).

EXAMPLE 9

A brake test was conducted in the same manner as in Example 8 except that the above carbon-carbon composite materials A were Employed as rotor disk materials and the above carton-carbon composite materials C were employed as stator disk materials.

The rotor disk material A is higher in thermal conductivity in the radial direction than the stator disk material C by 137.9 W/m·K.

As a test result, the brake tested indicated that its coefficient of friction was 0.54 and its average of the specific abrasion wear was $0.69 \times 10^{-5}$ cm$^3$/MJ, thus finding that the brake obtained had a large braking force (Table 7).

Comparative Example 13

A brake test was conducted in the same manner as in Example 8 except that the carbon-carbon composite materials A described above were employed as both rotor disk materials and stator disk materials.

As a result, the brake tested indicated that its coefficient of friction was 0.32 and its average of the specific abrasion wear was $0.73 \times 10^{-5}$ cm$^3$/MJ, thus finding that a standard brake was obtained (Table 7).

Comparative Example 14

A brake test was conducted in the same manner as in Example 8 except that the above carbon-carbon composite materials D were employed as rotor disk materials and the above carbon-carbon composite materials E were employed as stator disk materials.

The stator disk material E is higher in thermal conductivity in the radial direction than the rotor disk material D by 5.3 W/m·K.

As a test result, the brake indicated that its coefficient of friction was 0.32 and its average of the specific abrasion wear was $14.83 \times 10^{-5}$ cm$^3$/MJ. Thus, this brake was greatly increased in the abrasion wear as compared to that of Example 8 (Table 7).

Comparative Example 15

A brake test was conducted in the same manner as in Example 8 except that the above carbon-carbon composite materials A were employed as rotor disk materials and the above carbon-carbon composite materials F were employed as stator disk materials.

The rotor disk material A is higher in thermal conductivity in the radial direction than the stator disk material F by 115.8 W/m·K.

As a test result, the brake indicated that its coefficient of friction was 0.31 and its average of the specific abrasion wear was $5.70 \times 10^{-5}$ cm$^{-3}$/MJ. Thus, this brake was greatly increased in the abrasion wear as compared to that of Example 8 (Table 7).

Comparative Example 16

A brake test was conducted in the same manner as in Example 8 except that the above carbon-carbon composite materials B were employed as rotor disk materials and the above carbon-carbon composite materials F were employed as stator disk materials.

The rotor disk material B is higher in thermal conductivity in the radial direction than the stator disk material F by 27.8 W/m·K.

As a test result, the brake indicated that its coefficient of friction was 0.36 and its average of the specific abrasion wear was $7.09 \times 10^{-5}$ cm$^3$/MJ. Thus, this brake was greatly increased in the abrasion wear as compared to that of Example 8 (Table 7).

TABLE 7

| | Disk Constitution | Difference in Thermal conductivity between Rotor and Stator disk materials in radial direction W/m · K | Friction Co-efficient | Average Specific Abrasion wear of Disks ($10^{-5} \times$ cm$^3$/MJ) |
|---|---|---|---|---|
| Ex. 8 | B/[AA]/B | 88.0 | 0.40 | 0.44 |
| Ex. 9 | C/[AA]/C | 137.9 | 0.54 | 0.69 |
| Comp. Ex. 13 | A/[AA]/A | 0 | 0.32 | 0.73 |
| Comp. Ex. 14 | E/[DD]/E | 5.3 | 0.32 | 14.83 |
| Comp. Ex. 15 | F/[AA]/F | 115.8 | 0.31 | 5.70 |
| Comp. Ex. 16 | F/[BB]/F | 27.8 | 0.36 | 7.09 |

(Notes)
*1: A, B, C, D, E and F indicate carbon-carbon composite materials having respective different characteristics (refer to Tables 1 and 2).
*2: Symbols within [ ] indicate rotor disks, and other symbols indicate stator disks.
*3: Symbols/indicate a frictionally sliding surface.

According to the present invention, highly durable disk pad type brakes and multi-disk type brakes having frictional characteristics that match their uses, environments in which they are used and methods for controlling them, can be obtained.

What is claimed is:

1. A disk pad brake comprising a rotor disk provided with a carbon-carbon composite material (a) as a friction member, and at least one pad provided with a carbon-carbon composite material (b) as a friction member; said materials (a) and (b) being each composed of carbon fibers and a carbonaceous matrix; and the difference in thermal conductivity between said materials (a) and (b) being in a range of 30 to 450 W/m-K in a radial direction of each of said materials, wherein:

said material (a) is prepared by impregnating the carbon fibers with a thermoplastic organic precursor and firing so impregnated carbon fibers;

said material (b) is prepared by either 1) impregnating the carbon fibers with a thermoplastic organic precursor, firing so impregnated carbon fibers and then depositing pyrolytic carbon on so fired composite, or 2) depositing pyrolytic carbon on the carbon fibers, impregnating so obtained composite with a thermoplastic organic precursor and then firing so impregnated composite; and said carbon fibers used in at least either of said materials (a) and (b) are at least one member selected from the group consisting of pitch-based carbon fibers and precursors thereof.

2. A disk pad brake according to claim 1, wherein the thermoplastic organic precursors used in the preparation of the materials (a) and (b) are each a carbonaceous pitch.

3. A disk pad brake according to claim 2, wherein the carbon fibers of both the materials (a) and (b) are at least one member selected from the group consisting of pitch-based carbon fibers and precursors thereof.

4. A disk pad brake according to claim 3, wherein the material (a) is prepared by either 1) impregnating at least one member selected from the group consisting of pitch-based carbon fibers and precursors thereof with the carbonaceous pitch, firing so impregnated at least one member selected from the group consisting of carbon fibers and precursors and then depositing pyrolytic carbon on so fired composite, or 2) depositing pyrolytic carbon on at least one member selected from the group consisting of the pitch-based carbon fibers and precursors thereof, impregnating so obtained composite with the carbonaceous pitch and then firing so impregnated composite.

5. A disk pad brake according to claims 4, wherein the material (a) is composed of the pitch based carbonaceous matrix and the pitch-based carbon fibers in the form of either a laminate of two dimensional fabrics or a three-dimensional fabric; and the material (b) is composed of the pitch-based carbonaceous matrix and either a mat made of at least one member selected from the group consisting of continuous pitch-based carbon fibers and precursors thereof or a felt mat made of at least one member selected from the group consisting of staple pitch-based carbon fibers and precursors thereof and/or precursors thereof.

6. A disk pad brake according to claim 5, wherein the material (b) has a thermal conductivity of from 0.1 to 400 W/m·K in a radial direction thereof.

7. A disk pad brake according to claim 6, wherein the material (a) has a thermal conductivity of from 10 to 700 W/m·K in a radial direction thereof.

8. A disk pad brake according to claim 7, wherein a difference in thermal conductivity between the materials (a) and (b) is 0.1 to 700 W/m·K in the thickness direction thereof.

9. A disk pad brake according to claim 8, wherein the carbonaceous pitches as the thermoplastic organic precursors used in the preparation of the materials (a) and (b) are each an impregnating pitch having a softening point of 60° to 200° C.

10. A disk pad brake according to claim 9, wherein the carbonaceous matrix of the material (b) contains a phenol resin in an amount of 0.1 to 10 wt. % of the weight of the material (b).

11. A disk pad brake according to claim 4, wherein the material (b) has a thermal conductivity of from 0.1 to 400 W/m·K in a radial direction thereof.

12. A disk pad type brake according to claim 2, wherein the material (a) is prepared by either 1) impregnating the carbon fibers with the carbonaceous pitch, firing so impregnated carbon fibers and then depositing pyrolytic carbon on so fired composite, or 2) depositing pyrolytic carbon on the carbon fibers, impregnating so obtained composite with the carbonaceous pitch and then firing so impregnated composites.

13. A disk pad brake according to claim 12, wherein the carbon fibers of both the materials (a) and (b) are at least one member selected from the group consisting of pitch-based carbon fibers and precursors thereof.

14. A multi-disk brake comprising at least one rotor disk provided with a carbon-carbon composite material (c) as a friction member, and at least one stator disk provided with a carbon-carbon composite material (d) as a friction member; said materials (c) and (d) being each composed of carbon fibers and a carbonaceous matrix; and the difference in thermal conductivity between said materials (c) and (d) being in a range of 30 to 450 W/m-K in a radial direction of each of said materials, wherein:

said material (c) is prepared by impregnating the carbon fibers with a thermoplastic organic precursor and firing so impregnated carbon fibers;

said material (d) is prepared by either 1) impregnating the carbon fibers with a thermoplastic organic precursor, firing so impregnated carbon fibers and then depositing pyrolytic carbon on so fired composite, or 2) depositing pyrolytic carbon on the carbon fibers, impregnating so obtained composite with a thermoplastic organic precursor and then firing so impregnated composite; and said carbon fibers used in at least either of said materials (c) and (d) are at least one member selected from the group consisting of pitch-based carbon fibers and precursors thereof.

15. A multi-disk brake according to claim 14, wherein the thermoplastic organic precursor used in the preparation of the material (c) is a carbonaceous pitch.

16. A multi-disk brake according to claim 15, wherein the carbon fibers of both the materials (c) and (d) are at least one member selected from the group consisting of pitch-based carbon fibers and precursors thereof.

17. A multi-disk brake according to claim 16, wherein the material (c) is prepared by either 1) impregnating at least one member selected from the group consisting of the pitch-based carbon fibers and precursors thereof with the carbonaceous pitch, firing so impregnated, at least one member selected from the group consisting of carbon fibers and precursors and then depositing pyrolytic carbon on so fired composite, or 2) depositing pyrolytic carbon on at least one member selected from the group consisting of the pitch-based carbon fibers and precursors thereof, impregnating so obtained composite with the carbonaceous pitch and then firing so impregnated composite.

18. A multi-disk brake according to claim 17, wherein the material (c) is composed of the pitch-based carbonaceous matrix and the pitch-based carbon fibers in the form of either a laminate of two-dimensional fabrics or a three-dimensional fabric; and the material (d) is composed of the carbonaceous matrix and either a mat made of continuous pitch-based carbon fibers or a felt mat made of staple pitch-based carbon fibers.

19. A multi-disk brake according to claim 18, wherein the material (d) has a thermal conductivity of from 0.1 to 400 W/m·K in a radial direction thereof.

20. A multi-disk brake according to claim 19, wherein the material (c) has a thermal conductivity of from 10 to 700 W/m·K in a radial direction thereof.

21. A multi-disk brake according to claim 20, wherein a difference in thermal conductivity between the materials (c) and (d) is 0.1 to 700 W/m·K in a thickness direction thereof.

22. A multi-disk brake according to claim 21, wherein the carbonaceous pitch as the thermoplastic organic precursor used in the preparation of the material (c) is an impregnating pitch having a softening point of 60° to 200° C.

23. A multi-disk brake according to claim 22, wherein the carbonaceous matrix of the material (d) contains a phenol resin in an amount of 0.1 to 10 wt. % of the weight of the material (d).

24. A multi-disk brake according to claim 17, wherein the material (d) has a thermal conductivity of from 0.1 to 400 W/m·K in a radial direction thereof.

25. A multi-disk brake according to claim 15, wherein the material (c) is prepared by either 1) impregnating the carbon fibers with the carbonaceous pitch, firing so impregnated carbon fibers and then depositing pyrolytic carbon on so fired composite, or 2) depositing pyrolytic carbon on the carbon fibers, impregnating so obtained composite with the carbonaceous pitch and then firing so impregnated composite.

26. A multi-disk brake according to claim 25, wherein the carbon fibers of both the materials (c) and (d) are at least one member selected from the group consisting of pitch-based carbon fibers and precursors thereof.

* * * * *